June 23, 1970 J. L. RENNICK 3,517,116

ARRANGEMENT FOR CONVERTING A PAL COLOR TELEVISION SIGNAL TO AN NTSC COLOR SIGNAL

Filed July 21, 1967 2 Sheets-Sheet 1

Inventor
John L. Rennick
By Francis W. Crotty
Attorney

ARRANGEMENT FOR CONVERTING A PAL COLOR TELEVISION SIGNAL TO AN NTSC COLOR SIGNAL

Filed July 21, 1967 2 Sheets-Sheet 2

Inventor
John L. Rennick
By Francis W. Crotty
Attorney

3,517,116
ARRANGEMENT FOR CONVERTING A PAL COLOR TELEVISION SIGNAL TO AN NTSC COLOR SIGNAL

John L. Rennick, Elmwood Park, Ill., assignor to Zenith Radio Corporation, Chicago, Ill., a corporation of Delaware Continuation-in-part of application Ser. No. 629,764, Apr. 10, 1967. This application July 21, 1967, Ser. No. 655,103
Int. Cl. H04n 5/02
U.S. Cl. 178—5.4 11 Claims

ABSTRACT OF THE DISCLOSURE

A PAL color receiver includes a balanced type of amplitude modulator to which is supplied the chroma subcarrier signal which, in the PAL system, has a color phase sequence that alternates in successive image line intervals. A second signal, having a frequency twice that of the fundamental or subcarrier frequency of the chroma signal, is also applied to the modulator but only during every other line interval. The modulator is unbalanced in all line intervals in which only the chroma signal is present and therefore the chroma signal is repeated without change to the output circuit of the modulator during such intervals. During intervening line intervals in which the double frequency signal is also present, the modulator is balanced and there is developed in the same output circuit only the modulation product of the two applied signals. The modulation product is a phase-altered chroma signal in which the color phase sequence is reversed relative to that exhibited by the original chroma subcarrier signal in the same line intervals. Consequently, there is derived from the single output circuit of the modulator a modified chroma subcarrier signal in which the color phase sequence is the same in every line interval.

In short, the arrangement converts a PAL chroma subcarrier signal into the chroma subcarrier signal characteristic of the NTSC color system.

RELATED APPLICATION

The present application is a continuation-in-part of application Ser. No. 629,764, filed on Apr. 10, 1967 in the name of John L. Rennick and assigned to the assignee of the present invention.

BACKGROUND OF THE INVENTION

It is well-known that in the type simultaneous color television system practiced today phase errors introduced into the composite color signal from whatever source, be it a failing of terminal apparatus or the influence of multipath effects, have a distinctly adverse effect on the quality of the color of the reproduced image. This results from the fact that phase errors cause cross-talk in the color signal components derived in the reciver and utilized in contributing hue and saturation information to the reproduced image. While there is a certain allowable tolerance for misphasing, errors of the order of 10° or more become perceptible and techniques are known to reduce their effects.

One technique that has been proposed heretofore, even though not adopted into the color signal specifications prescribed by the Federal Communications Commission, is known as oscillating color sequence or color phase alternation. It contemplates a periodic change in the phase sequence of the derived color components so that instead of the color sequence being retained as green, red and blue with increasing phase angle, the sequence is changed at a chosen frequency or rate to green, blue and red. The periodicity of the change in sequence is not especially significant; it may be occasioned at the field or line rate or even at a sub-line rate. This oscillation or change of color sequence is said to reduce the cross-talk and color degradation attributable to phase error. A complete description of this concept and earlier proposals for practicing it are available in the literature. It is included in an article "Recent Improvements in Band-Shared Simultaneous Color-Television Systems" by B. D. Loughlin published in The Proceedings of the IRE of October 1951, pages 1264 to 1279; see especially Part II commencing at page 1273. A further description is available in the patent literature; see U.S. Pat. 2,943,142 issued to B. D. Loughlin on June 28, 1960.

Color phase alternation is of little more than academic interest to television broadcasting in this country because it is no part of the current signal specifications of the NTSC system. It is a feature, however, of the PAL type of simultaneous color system in which the color phase sequence of the chroma signal reverses with each line of the image and this system has recently been adopted for use in a number of European countries. For this reason, and recognizing the possibility that the alternating color sequence technique may be adopted elsewhere, there is need for arrangements for accommodating the PAL type transmission, accomplishing the demodulation of the color information with simple and reliable apparatus.

One apparatus solution described in the afore-identified literature utilizes the principle that when a time sequentially modulated wave signal including both sidebands is heterodyned with a second harmonic of the wave signal, another modulated wave signal is derived having the same mean frequency as the first but with a frequency spectrum that is inverted relative to that of the first signal. The reversal of frequency spectrum also effects a reversal of the phase positioning of the modulation signals on the developed wave signal with respect to those of the first mentioned signal. Consequently, it has been proposed that the PAL receiver be provided with a two position switch for selectively coupling the color demodulator to either of two signal paths. The first path translates the received chroma subcarrier signal without modification but the second leads from the output circuit of a balanced modulator to which has been supplied both the received chroma subcarrier and a signal of twice the subcarrier frequency so that the output from the modulator is a phase-altered chroma subcarrier having a color phase sequence that is reversed relative to that of the received chroma signal. Operation of the switch at the line rate of the system selects portions of both the original chroma subcarrier and the phase-altered chroma subcarrier to the end that a modified chroma signal, in all material respects the same as the chroma subcarrier of the NTSC system, is delivered to the color demodulator for detection. Although this arrangement is operative to accomplish the intended result, it is unnecessarily complex and costly compared with that to be described herein.

SUMMARY OF THE INVENTION

Applicant's earlier filed and copending application discloses a color demodulator featuring a novel balanced form of amplitude modulator. That modulator comprises a unique arrangement of differential amplifiers, preferably employing transistor devices and arranged normally to establish in an output circuit only the modulation products of the pair of signals applied to the modulator. The present invention is a further extension of that development, predicated on the discovery that the balanced modulator structure may be arranged as an effective converter for conveniently and easily modifying the chroma subcarrier signal of a PAL system into the chroma subcarrier signal of the NTSC system and vice versa. It has the distinct advantage of simplification over the prior art considered above.

The conversion arrangement is equally useful at the transmitting and receiving terminals of a television system although the specific disclosure is for convenience confined to its receiver application.

It is accordingly a principal object of the invention to provide a novel arrangement for modifying the color phase schedule of the chroma subcarrier signal of a color television signal.

It is a further object of the invention to provide an improved and simplified arrangement for modifying the color phase schedule of the chroma subcarrier signal of a color television system.

It is a very particular object of the invention to provide a novel and simplified arrangement for converting the characteristics of the chroma subcarrier signal of a PAL system to those of the NTSC system or vica versa.

An arrangement, constructed in accordance with the invention, for modifying the color phase schedule of the chroma subcarrier signal of a color television signal comprises a balanced-type of amplitude modulator having a pair of input circuits and an output circuit. Means are provided for applying to one of those input circuits a chroma subcarrier signal modulated in a first phase schedule with color components of an image. Other means apply to the remaining input circuit, but only during time spaced modulating intervals, another signal having a frequency which is twice that of the fundamental or subcarrier frequency of the chroma signal. The modulator has an unbalanced condition in intervals intervening the modulating intervals in order to translate the chroma signal unchanged to the output circuit in such intervening intervals but the modulator has a balanced condition during the modulating intervals thereby to develop in the output circuit in the modulating intervals only a phase-altered chroma signal modulated with the same color components but occurring in a different phase schedule. Finally, there are means for deriving from the output circuit of the modulator a modified chroma signal comprising portions of the chroma signal alternating with portions of the phase-altered chroma signal.

As used herein, the expression "phase schedule" is used to connote the character of the phase sequence of the chroma subcarrier signal as observed over a long period. For example, as applied to the usual NTSC subcarrier the phase schedule is one in which the color phase sequence of the subcarrier is retained the same throughout the program whereas in the environment of the PAL system the expression phase schedule refers to the fact that the color components have a given phase sequence in alternate line intervals but a reversed phase sequence in the intervening line intervals. Within the context of this application, a change of phase schedules is typified by a change between the NTSC and the PAL systems as reflected in the color sequences of their individual subcarrier signal components.

BRIEF DESCRIPTION OF THE DRAWINGS

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF PREFERRED EMBODIMENTS

Figure 1:
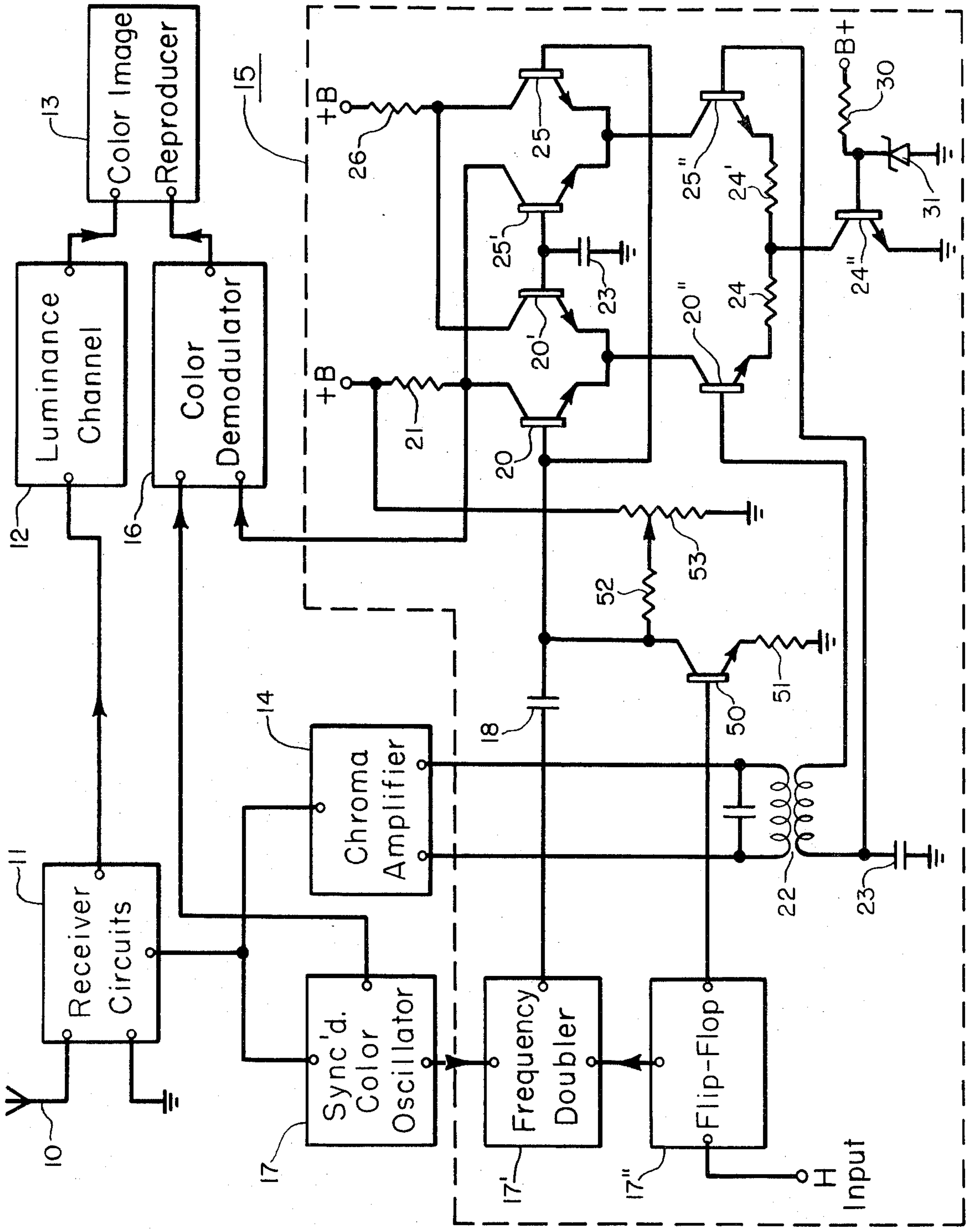
FIG. 1 is a schematic diagram, partially in block form, of a PAL type receiver employing a converting arrangement in accordance with the invention.

Referring now more particularly to FIG. 1 the receiver there represented is of the PAL type, that is to say, it is intended to utilize a transmission in accordance with the specifications of the PAL system. As will be made clear hereafter, the convertor of the present invention modifies the chroma subcarrier component of the received PAL transmission to the end that, as delivered to the color demodulator of the receiver, it appears to be an NTSC signal. Ignoring for the time being the structure and mode of operation of that convertor, a cursory explanation of the make up and operation of the receiver will be undertaken as though it were one of the NTSC type.

The color transmission is intercepted by an antenna system 10 and applied to the receiver circuits designated in block form at 11. These circuits comprise the customary tunable front end, the oscillator modulator, stages of intermediate frequency amplification and picture detector. The brightness or luminance information derived in the picture detector is applied through a luminance channel 12 to a color image reproducer 13 which usually is the three-gun shadow mask cathode-ray tube. At the same time the chroma subcarrier signal derived in unit 11 is applied through a chroma amplifier 14 and a convertor 15, to be described more particularly hereafter, to a color demodulator 16 wherein the necessary color components are obtained through demodulation and matrixing for application to color image reproducer 13. The demodulating or injection signal required in color demodulator 16 is developed in a local color oscillator 17 appropriately synchronized by means of a color phase detector in usual fashion with the color burst information conveyed on the received color signal. As thus far described the receiver is completely conventional in construction and operation, deriving both a luminance component and a chrominance component from the received program signal, operating upon them with the necessary amplification and demodulation to obtain suitable signals for controlling reproducer 13 and developing an image in simulated natural color.

Obviously, where the reproducer is of the cathode-ray type deflection circuits are required and they must be timed to function synchronously with corresponding apparatus at the transmitter. Since all of this is conventional, it has not been shown and need not be considered in any further detail. For the same reason such other conventional accessories as color purity, static and dynamic color convergence have likewise been omitted from the drawing for the sake of simplicity. And for the same reason no audio system has been shown although obviously it would be required as a necessary ingredient for the full reproduction of the broadcast signal.

Referring now more particularly to unit 15, the arrangement of the invention for modifying the color phase schedule of the chroma subcarrier signal comprises a balanced type of amplitude modulator having a pair of input circuits and an output circuit. Preferably, and as illustrated in the drawing, this modulator is a unique combination of a pair of transistor differential amplifiers cross coupled to function as a balanced modulator. The structural details and operation of that modulator are fully disclosed in applicant's copending application to which reference may be had; for present purposes the drawing has been simplified by omitting certain of the biasing circuitry for the various transistor devices but which may take the form shown and described in the copending application. The discussion herein shall be limited essentially to the structure and operation of the signal translating circuits of the demodulator.

The first differential amplifier or mixer of unit 15 has a pair of balanced, preferably identical, transistors 20, 20' individually having input, output and common electrodes more conventionally referred to as base, collector and emitter electrodes respectively. A load impedance 21 connects to the collector of transistor 20 and to a unidirectional voltage source +B while a high impedance current source is connected in common to the emitters of transistors 20, 20' and serves as means for applying to one of the input circuits of the demodulator a chroma subcarrier signal modulated in a first phase schedule with color components of an image. Structurally, it comprises a third transistor 20'' preferably identical to the other transistor pair 20, 20'. The collector-emitter path of transistor 20'' which represents a high impedance is connected in common with the emitters of transistors 20, 20' and the input or base electrode of transistor 20'' is coupled to chroma amplifier 14 through a tuned transformer 22. The primary of this transformer is resonant at the fundamental or carrier component of the chroma signal which it receives from amplifier 14. One terminal of the secondary connects to the base of transistor 20'' while the other terminal is bypassed to ground for signal frequencies by capacitor 23.

The means for applying to the other input circuit of the demodulator a signal having a frequency twice that of the fundamental or subcarrier of the chroma component of the received color television program signal comprises a frequency doubler 17' which is driven from the local color oscillator 17 of the television receiver. The output of frequency doubler 17' is applied by a capacitor 18 to the base of transistor 20.

For reasons to be made clear presently, it is desirable that the double frequency signal be effectively applied to the modulator only during time spaced modulating intervals which, since the illustrative example has to do with the PAL type signal transmission, correspond with every other line interval of the program signal. Obviously, this result can be obtained by feeding the double frequency signal to the modulator through a gated amplifier or in any of a number of ways; as shown, however, a flip flop or bistable circuit 17'' keys or gates frequency doubler 17' so that it is effective and produces a double frequency signal component in its output circuit only during the desired alternate line intervals of the program signal. The flip flop circuit, in turn, is synchronized with horizontal information of the television system as indicated by the terminal H which connects, in any known fashion, to the horizontal system of the receiver to the end that horizontal drive or sync pulses are applied to the flip flop to control and phase its operation.

As thus far described transistors 20, 20' and their associated circuitry define a mixer but, as explained in the copending application, in order to obtain balanced operation without requiring the use of inductors, a second differential amplifier or mixer is provided, comprising transistor pair 25, 25' with a third transistor 25'' serving as a common emitter impedance to the pair 25, 25'. A load impedance 26 connects the collector of transistor 25 to a unidirectional potential source +B whereas the collector of transistor 25' connects with collector load 21 of transistor 20. A similar cross coupling extends from the collector of transistor 20' to the collector of transistor 25. These differential amplifiers 20, 20', 20'' and 25, 25', 25'' are operated in the saturation mode.

The condition of balanced operation requires proper phase relations of the signals applied to the described pair of differential amplifiers collectively functioning as a balanced modulator. The double frequency signal component is applied in like phase to transistors 20 and 25 by way of a connection between their bases while the chroma signal is applied to the emitters of transistors 20, 20' in one phase and to the emitters of transistors 25, 25' in opposed phase through the connections with transistors 20'' and 25''. To attain the proper phasing, the emitters of amplifiers 20'', 25'' are connected to a common high impedance to constitute therewith a third differential amplifier operating in its linear mode and translating the chroma signal received from amplifier 14. In particular, the emitters of transistors 20'', 25'' connect through resistors 24, 24' to the collector-emitter path of yet another transistor 24'' having its emitter coupled to a plane of reference potential, such as ground, and its base suitably biased from a network provided by a potential source +B and a resistor 30 connected in series with a Zener diode 31 to ground. The base of transistor 20'' is coupled to amplifier 14 through transformer 22 as described above. Capacitor 23 connected to the base of transistors 20', 25' is a signal bypass.

The described balanced modulator is normally arranged by appropriate selection of its components and voltage sources to have balanced direct current conditions so that if there are no signals applied to its input circuits from sources 14 and 17' or if a signal is applied from only one of these sources, no signal is developed at either output load 21 or 26. For the conversion process to be accomplished with the arrangement under consideration, however, in which the double frequency input signal is applied only during time spaced modulating intervals, it is desired that the modulator be in a condition of D.C. unbalance in the absence of the double frequency signal to the end that, because of the unbalance, the chroma subcarrier signal received from amplifier 14 is translated without change, at least so far as its phase schedule is concerned, to output loads 21, 26. This unbalanced condition, appropriately timed with respect to the periodic application of the double frequency signal component to the modulator, is established by an unbalancing signal introduced from a second connection extending from flip flop 17'' to the base of a transistor 50. The emitter of this transistor is connected to ground through a resistor 51 while its collector connects through a resistor 52 to the tap of potentiometer 53 connected between potential source +B and ground. The collector of transistor 50 is also connected to the base of transistor 20. The output from flip flop 17'' is essentially a square wave signal having one phase as delivered to frequency doubler 17' and of opposite phase as applied to transistor 50, so that units 17' and 50 are operative in alternation. Consequently transistor 50 under the influence of this square wave signal conducts and creates an unbalance in the modulator only during those intervals in which no double-frequency signal is supplied from source 17'.

Only a single output is taken from the described balanced modulator as shown by a connection from load impedance 21 of transistor 22 to an input terminal of color demodulator 16.

In describing the operation of the chroma signal convertor including unit 15, it will be assumed that the described modulator in the absence of all applied signals exhibits a condition of D.C. balance. It will further be assumed that potentiometer 53 is adjusted to the end that the signal developed in load 21 in the presence of an unbalanced condition established by conduction in transistor 50 has substantially the same amplitude as the signal developed in the same load impedance with both the chroma and the double frequency signals applied to the two inputs of the modulator. Finally, it will be assumed that the bursts of double frequency signal are applied to the modulator in proper phase synchronism with the changing color phase sequence of the chroma signal of the received program signal.

Based on these assumptions, the converter operates to convert the chroma subcarrier signal from the phase schedule exhibited by a PAL transmission to the different phase schedule of the NTSC transmission. The PAL chroma signal component selected from the received program signal in amplifier 14 and applied to one input of the modulator through differential amplifier 20'', 25'' is modulated with color components of an image occurring in a phase sequence that reverses in successive line intervals. Concurrently, a double frequency signal is applied through capacitor 18 to the second or other input of the modulator but only during time spaced modulating intervals which may be assumed to be phase synchronized with the odd line intervals of the received program signal.

Accordingly, in all odd line intervals transistor 50 is nonconductive, the modulator is balanced and there are signals applied to both input circuits of the modulator which mix with one another to develop in output circuit 21 for application to demodulator 16 only the modulation product of the applied signals. As explained above this modulation product is a phase-altered chroma signal having the same mean frequency and modulated by the same color components as the originally received chroma signal. However, the phase sequence of color components of the phase-altered chroma signal is reversed compared to the phase sequence of color components exhibited by the original chroma signal during odd line intervals.

During even numbered line intervals of the program signal, the output of frequency doubler 17′ is effectively interrupted and only the received chroma signal component selected by amplifier 14 is presented to a modulating signal input circuit of the amplitude modulator. At the same time, the square wave output signal from flip flop 17″ drives transistor 50 into conduction and causes the modulator to exhibit a condition of D.C. unbalance. Because of the unbalanced condition, the chroma signal applied through differential amplifier 20″, 25″ is translated without change, so far as the phase sequence of its color components is concerned, to load circuit 21. Therefore the modified chroma signal derived at load 21 and delivered to demodulator 16 in even numbered line intervals exhibits the same phase sequence of its color components as the received program signal.

In short, during even numbered line intervals the output signal taken from load 21 comprises portions of the received chroma signal as delivered from amplifier 14. On the other hand, during odd numbered line intervals the output signal from load 21 is the intermodulation product of the double frequency signal and the received chroma signal and is the above-mentioned phase-altered chroma signal which has experienced a reversal in the phase sequence of its color components. The phase schedule of the received chroma signal is one in which the phase sequence of color components reverses from one image line to the next, but the phase schedule of the modified chroma signal is different. Specifically, the phase sequence of the modified chroma signal derived at load 21 for application to demodulator 16 corresponds to a reversal of the phase sequence of color components of those portions of the original chroma signal occurring only in odd line intervals so that, unlike the original chroma signal, the color phase sequence of the modified chroma is fixed and does not reverse from time to time. If the converting arrangement is adjusted as described in the stated set of assumptions, the output signal delivered to color demodulator 16 from the modulator of unit 15 comprises the even numbered image line intervals of the original chroma signal alternating with the phase-altered chroma signal developed by modulating the double frequency signal with odd numbered line intervals of the original chroma signal. The successive line interval portions of this output signal have the same color phase sequence as the even line interval portions of the original chroma signal and are of equal amplitude so that as applied to demodulator 16 the modified chroma signal is seen to correspond to that which is typified by the NTSC specifications.

As fully developed in the text of applicant's copending application, the balanced modulator constructed of cross coupled differential amplifiers or product mixers is especially attractive for processing through integrated circuitry of the monolithic, thin film or thick film type. This same feature may be used to advantage in constructing the convertor arrangement under consideration. One embodiment formed principally of monolithic components is shown, for example, in FIG. 2 where monolithic chip 40 includes the transistors and fixed resistors of the balanced modulator of unit 15 of FIG. 1. Connections are made to certain terminals of chip 40 and their relation to the circuitry of FIG. 1 is set forth in the following:

TABLE I

| Terminal No.: | Circuit point |
|---|---|
| **1, 2, 4, 8** | Not used. |
| **3** | Output terminal of load impedance **21**. |
| **5** | Ground. |
| **6** | Input to transistor **20″**. |
| **7** | Decoupling Terminal. |
| **9** | Input to transistor **20′**. |
| **10** | Power supply terminal. |

Variable resistor 33 is connected through the chip to a potential source, serving as a bleeder for the purpose of introducing a D.C. unbalance and the chroma input is applied through a coupling capacitor 41.

Frequency doubler 61 is shown as a transistor circuit having the chroma subcarrier fundamental applied to its base from the local color oscillator through a capacitor 58. The input terminal for this signal component is designated 4.43 megahertz which happens to be the chroma fundamental frequency adopted for the PAL system. The collector circuit of transistor 61 is a resonant or tank circuit comprising a coil 59 and a capacitor 60 tuned to twice the fundamental of the chroma subcarrier or 8.86 MHz. The emitter of transistor 61 connects to ground through a resistor 62 and a shunt capacitor 63.

The controlling flip flop circuit is also a monolithic chip 65 but in this embodiment supplies only an output signal to the base of transistor 61 to pulse modulate the operation of the frequency doubler. The connection is from terminal 7 through a resistor 64. The other external connections of chip 65 include a synchronizing terminal H connected to terminal 2 through a resistor 66, a connection from terminal 8 to the operating potential supply +24 v. through a resistor 67, a ground connection from terminal 4 and a reset or phasing connection from terminal 3 to a resonant network comprising a coil 74 and a capacitor 75 tuned to one-half the line scanning frequency.

Resonant circuit 74, 75 is connected to the output of a limiter and differential amplifier to develop a sine wave, utilized in phase synchronizing flip flop 65. This amplifier is also in the form of a chip 69 having an input designated ½H to which is applied a signal having a component at one-half the horizontal scanning frequency of the color receiver. It is customary practice in the construction of such a receiver to provide a phase detector which makes a phase comparison of the output of the local color oscillator and the color frequency bursts of the program signal in order to assure phase synchronization of the local color oscillator. Such a phase detector would be included in block 17 of the receiver of FIG. 1. Where the program signal is of the PAL type, characterized by the fact that the phase sequence of its color components modulated on the chroma subcarrier signal reverses in alternate line intervals, the output of the phase detector has a signal component of half horizontal or line frequency that may be applied to terminal ½H and, after shaping, utilized to phase lock flip flop 65 to avoid phase ambiguity.

The external connections of chip 69 include capacitor 70 coupling input terminal ½H to terminal 3, a resistor 71 connected between high input terminal 3 and low input terminal 5, a ground connection from terminal 4, a power supply connection from terminal 8 through a resistor 76, a resistor 72 connected between output terminals 1 and 7 and a capacitor 73 coupling output terminal 7 to tuned circuit 74, 75. Coil 74 may be slug tuned as indicated to facilitate phase adjustment of the sine wave delivered from resonant circuit 74, 75 to the flip flop 65.

The flip flop is an Eccles-Jordan, multi-vibrator or other well-known form of bistable circuit which may be driven from one stable operating condition to the other by successive horizontal-frequency pulses applied to terminal H. Moreover, it has the attribute of assuming a given one of its two possible stable conditions whenever a horizontal pulse applied to input H is coincident with the positive peak of the half line frequency sine wave delivered from resonant circuit 74, 75 to terminal 3 of the bistable circuit. This assures the desired condition of phase lock for the double frequency signal component developed in the circuit of transistor 61.

Figure 2:
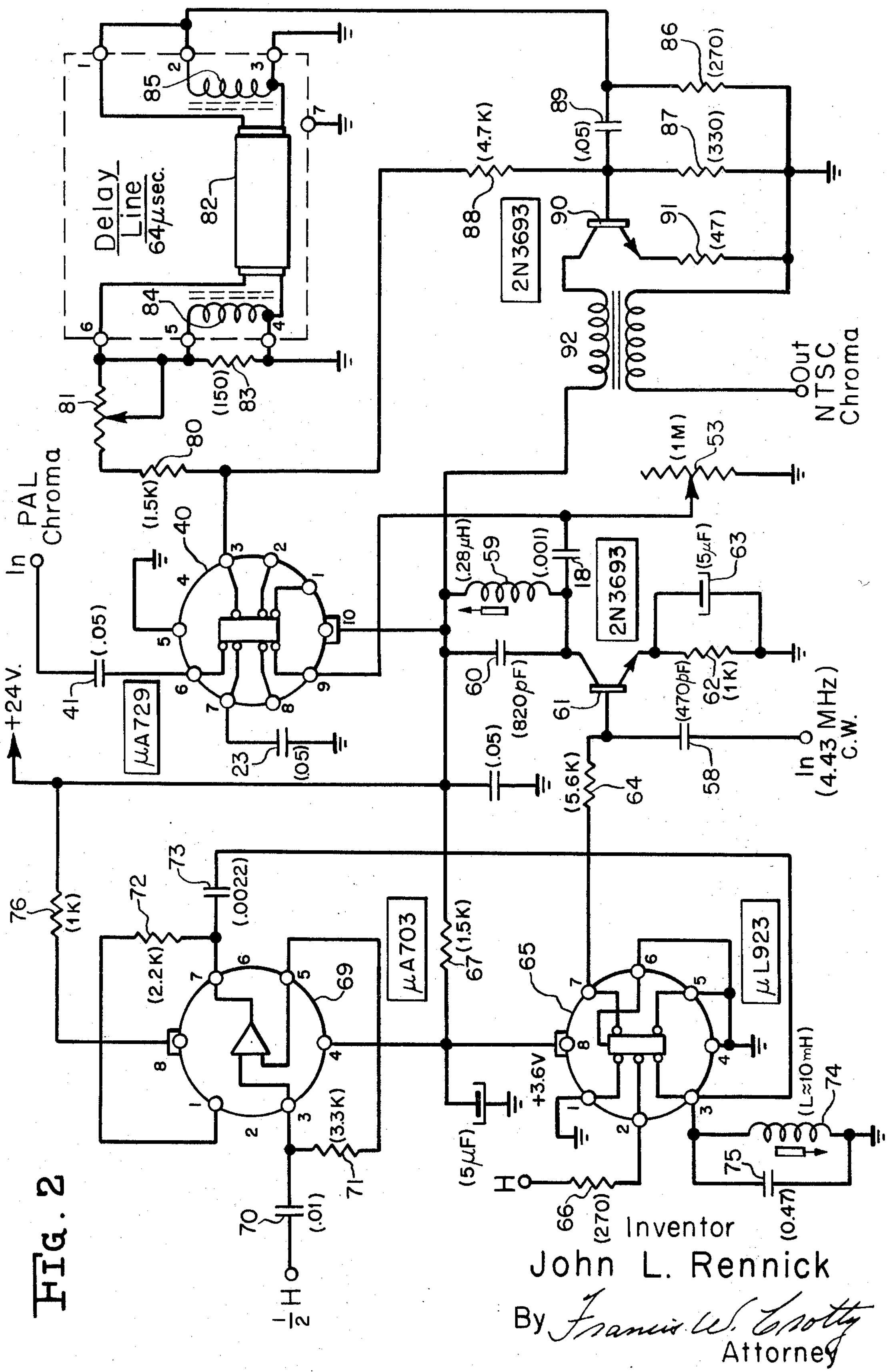
FIG. 2 is another representation of the convertor arrangement featuring integrated circuit components.

The arrangement of FIG. 2 as thus far described may be utilized in the receiver of FIG. 1 in place of unit 15 and operates in substantially the same fashion as the counterpart of FIG. 1, producing at output terminal 3 of chip 40 a converted chroma subcarrier signal, that is to say, a chroma subcarrier signal which is in all material respects the same as that typified by the NTSC system. In this embodiment, however, there is no square wave signal applied from flip flop 65 to modular 40 in order to create the required D.C. unbalance during those line intervals in which the original chroma signal is to be translated to output terminal 3 of chip 40 without undergoing any change in the phase sequence of its color modulation components. Instead, variable resistor 53 is adjusted to establish the requisite D.C. unbalance and the peak to peak value of the double frequency signal is made large compared to the signal level needed to drive the transistors (e.g. 20, 20′ and 25, 25′ of FIG. 1) of the saturation-mode differential amplifiers to a condition of saturation. Where such a signal level is used, balanced modulation is achieved in the presence of the original chroma signal and the double frequency signal as required.

The output signal derived from the convertor, particularly at output terminal 3 of chip 40, is applied through a resistor 80 and an adjustable attenuator 81 to the input terminals of a time delay network 82 exhibiting a time delay corresponding to one line interval of the program signal. The input of the delay line is terminated by a resistor 83 and an inductor 84 which collectively properly terminate the line to protect against reflections. The opposite or output end of the line is similarly terminated by an inductor 85 and a resistor 86 in conjunction with a capacitor 89 and a further resistor 87 as shown. Through this arrangement, a delayed chroma signal is developed across impedance 87. An undelayed signal from output terminal 3 of modulator chip 40 is likewise applied to resistor 87 through a resistor 88. As a consequence, the delayed and undelayed signals are combined in the common resistor 87 to provide an averaging effect which gives an improvement with respect to phase error. Of course, it is highly desirable that the delayed and undelayed signals have essentially the same amplitude and this is achieved by the adjustable attenuator 81.

While the averaging effect provided by the delayed signal from line 86 and the undelayed output from modulator chip 40 is not essential, it is desirable and when employed, the converted signal from the arrangement of FIG. 2 is available at the high potential terminal of resistor 87. However, it is preferred that the converted signal be delivered to the terminal marked "NTSC Chroma Out" through a transistor amplifier 90 for application to color demodulator 16.

Accordingly the base of this transistor connects to the high potential terminal of resistor 87, its emitter connects to ground through a resistor 91 and its collector is connected to the power supply through the primary winding of an output transformer 92.

The values of the components utilized in one practical embodiment of the invention are included within the parentheses in FIG. 2 and the letter-numeral combinations associated with the chips and transistors are the commercial designation of these components as supplied by Fairchild Camera and Instrument Corporation.

The potential supply was +24 volts as indicated. The peak-to-peak value of the chroma signal was 0.5 volt. The injection had a peak-to-peak value of three volts and the square wave output of the flip-flop was .5 volt peak-to-peak.

The described convertor is a simplified structure for changing the phase characteristics of a chroma subcarrier signal from PAL to NTSC or vice versa. It may be utilized in the transmitting as well as the receiving apparatus of a color television system and lends itself particularly well to integrated circuit form. If packaged as an adapter, it provides ready convergence from a NTSC to a PAL type of receiver.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An arrangement for modifying the color phase schedule of the chroma subcarrier signal of a color television system comprising:

- a balanced-type of amplitude modulator having a pair of input circuits and an output circuit;
- means for applying to one of said input circuits a chroma subcarrier signal modulated in a first phase schedule with color components of an image;
- means for applying to the other of said input circuits during timed spaced modulating intervals another signal having a frequency twice that of the fundamental or subcarrier frequency of said chroma signal;
- means for establishing in said modulator an unbalanced condition in intervals intervening said modulating intervals to translate said chroma signal unchanged to said output circuit in said intervening intervals and for restoring a balanced condition in said demodulator during said modulating intervals to develop in said output circuit in said modulating intervals only a phase-altered chroma signal modulated with said color components in a different phase schedule;
- and means for deriving from said output circuit a modified chroma signal comprising portions of said chroma signal and said phase-altered chroma signal in alternation.

2. An arrangement in accordance with claim 1 in which the phase sequence of the color components reverses periodically in said first schedule and in which the phase sequence of the color components remains fixed or invariable in said different schedule.

3. An arrangement in accordance with claim 2 in which the phase reversal of the color components in said first schedule occurs at the line scanning frequency of the color system.

4. An arrangement in accordance with claim 2 in which said means for applying another signal includes a source of a signal at twice the subcarrier frequency of said chroma signal and which is effective only during operating intervals in which the color components of the chroma signal exhibit a particular one of their two possible phase sequences.

5. An arrangement in accordance with claim 4 in which said means for establishing said unbalanced condition of said demodulator comprises means for applying an unbalancing signal to said demodulator only during intervals which intervene said modulating intervals.

6. An arrangement in accordance with claim 4 in which said modulator has a D.C. unbalance during said intervening intervals and in which the amplitude of said other signal is sufficiently high to effect balanced operation of the demodulator during said modulating intervals.

7. An arrangement for modifying the color phase schedule of the chroma subcarrier signal of a color television system comprising:

a balanced-type of amplitude modulator having a pair of input circuits and an output circuit;

means for applying to one of said input circuits a chroma subcarrier signal modulated with color components of an image occurring in a phase sequence that reverses in successive line intervals;

means including a signal generator for applying to the other of said input circuits during alternate line intervals of said chroma subcarrier signal another signal having a frequency twice that of the fundamental or subcarrier frequency of said chroma signal;

means for establishing in said modulator an unbalanced condition in the absence of said other signal to translate said chroma signal unchanged to said output circuit and for restoring a balanced condition in said modulator in the presence of said other signal to develop in said output circuit during said modulating intervals a phase-altered chroma signal modulated with said color components but in a reversed phase sequence relative to the phase sequence of such color components in the corresponding part of said chroma subcarrier signal;

and means for deriving from said output circuit a modified chroma signal comprising portions of said chroma signal and said phase-altered chroma signal alternating at the line frequency rate of the color system.

8. An arrangement in accordance with claim 7 in which said signal generator is a frequency doubler to which a signal corresponding to the fundamental of said chroma signal is applied and which is phase synchronized with line scanning information of said color television system.

9. An arrangement in accordance with claim 7 in which said signal generator includes an oscillator for developing a signal corresponding to and synchronized with the fundamental of said chroma signal, a frequency doubler driven by said oscillator, and a phase control network for phase synchronizing said other signal to alternate image line intervals of said color television system.

10. An arrangement in accordance with claim 7 in which said balanced modulator is an integrated circuit comprising a pair of cross coupled differential amplifiers operated in saturation mode and a linear mode differential amplifier having a pair of output circuits individual including an assigned one of differential amplifiers.

11. An arrangement in accordance with claim 10 in which said double-frequency signal is applied to said saturation-mode amplifiers and said chroma signal is applied to said linear-mode amplifier.

References Cited

UNITED STATES PATENTS 3,384,706 5/1968 Davidse ------------- 178—5.4

ROBERT L. GRIFFIN, Primary Examiner

J. C. MARTIN, Assistant Examiner